(12) United States Patent
Matama

(10) Patent No.: US 6,754,402 B2
(45) Date of Patent: Jun. 22, 2004

(54) INTERPOLATION ARITHMETIC METHOD AND IMAGE READER

(75) Inventor: Toru Matama, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 685 days.

(21) Appl. No.: 09/779,745

(22) Filed: Feb. 9, 2001

(65) Prior Publication Data

US 2001/0021008 A1 Sep. 13, 2001

(30) Foreign Application Priority Data

Feb. 9, 2000 (JP) .................................. 2000-031491

(51) Int. Cl.[7] .................................................. G06K 9/32
(52) U.S. Cl. ...................... 382/300; 382/312; 358/483
(58) Field of Search ................................. 382/300, 312; 358/1.9, 471, 482, 483, 505, 513, 514

(56) References Cited

U.S. PATENT DOCUMENTS

| | | | | |
|---|---|---|---|---|
| 5,459,509 A | * | 10/1995 | Monoi ........................ 348/248 |
| 5,500,746 A | * | 3/1996 | Aida .......................... 358/518 |
| 5,696,550 A | * | 12/1997 | Aoki et al. .................. 348/125 |
| 5,917,620 A | * | 6/1999 | Hasegawa et al. .......... 358/513 |
| 6,593,557 B1 | * | 7/2003 | Street ....................... 250/208.1 |

* cited by examiner

*Primary Examiner*—Yon J. Couso
(74) *Attorney, Agent, or Firm*—Sughrue Mion, PLLC

(57) ABSTRACT

An interpolation arithmetic method and an image reader are provided which, in reading a film image using an area CCD sensor in which reading elements are arranged in a hound's tooth check form, is capable of making full use of excellent characteristics of the area CCD sensor. The interpolation arithmetic method and the image reader can be realized by interpolating first image signals of the neighboring two or more reading elements to allocate the second image signals and outputting the interpolated second image signals or the first and second image signals in a square check form, and by providing a light source section; an area image sensor; an imaging optical system; and at least one of pixel shifting device of the area image sensor, and an interpolation arithmetic section for rearranging the second image signals of pixels in the square check form by performing interpolation arithmetic of first image signals outputted from respective reading elements of the area image sensor.

14 Claims, 6 Drawing Sheets

INTERPOLATION ARITHMETIC METHOD AND IMAGE READER

BACKGROUND OF THE INVENTION

1. Field of the Invention

The present invention belongs to the technical field of film image reading that is utilized for digital photo-printers and the like and, more specifically, the present invention relates to an interpolation arithmetic method that is preferably utilized in reading images using an area image sensor in which reading elements are arranged in a hound's tooth check form, and to an image reader that uses the area image sensor.

2. Description of the Related Art

Heretofore, images recorded on photographic films such as negative and reversal films (which are hereunder referred to simply as "films") have been commonly printed on light-sensitive materials (photographic paper) by means of direct exposure in which the film images are projected onto the light-sensitive materials.

On the other hand, in recent years, a printing apparatus which utilizes digital exposure, that is, a digital photo-printer, has been put to practical use which photoelectrically reads an image recorded on a film, converts the read image to a digital signal and then to image data for recording purposes by applying various kinds of image processing, scans to expose a photosensitive material by recording light modulated according to the image data to record an image (a latent image), and has a (finished) print.

The digital photo-printer is basically composed of a scanner for photoelectrically reading an image recorded on a film (an image reader), an image processing apparatus for applying predetermined processing on image data read by the scanner or image data supplied by a digital camera or the like to have image data for image recording, i.e., exposure conditions, a printer for recording a latent image by scanning to expose a photosensitive material by, for example, an optical beam scanning (an image recording apparatus), and a processor for applying development processing on the photosensitive material exposed by the printer to have a (finished) print on which the image is reproduced (an developing apparatus).

According to such a digital photo-printer, since an image is processed as digital image data, not only an image photographed on a film but also an image photographed by a digital camera or the like and an image obtained by communication network such as the Internet can be outputted as a print.

In addition, since image processing (optimization) can be performed by image data processing, a high-definition print can be obtained which was unavailable with a conventional direct exposure by preferably performing gradation adjustment, color balance adjustment, color/density adjustment, and the like.

A scanner (including various kinds of film scanners) provided in the digital photo-printer of this kind, for example, makes reading light incident on a film (its one image=one frame) to acquire projected light that carries the image, images the projected light on an area image sensor such as an area CCD sensor, and photoelectrically reads the image. By reading the image step by step using reading light of R (red), G (green) and B (blue), the image photographed on the film is resolved to three primary colors, R, G and B, and is photoelectrically read.

Here, in the scanner using such an area CCD sensor, an image is usually read using an area CCD sensor in which reading elements are arranged in a square check form or square form (usually arranged in the longitudinal direction and latitudinal direction of the film).

On the other hand, in recent years, an area CCD sensor in which reading elements are arranged in a hound's tooth check form has been realized, which is used in a digital camera and the like.

With the area CCD sensor in which reading elements are arranged in a hound's tooth check form, since the reading elements can be arranged more densely compared with the conventional CCD sensor having the square check form arrangement of reading elements, area efficiency of a receiving section can be made extremely high. As a result, higher sensitivity, more reduced noise (improved S/N ratio), wider dynamic range, or the like can be attained compared with the conventional area CCD sensor having the square check form arrangement of reading elements.

In addition, the area CCD sensor in which reading elements are arranged in a hound's tooth check form also has an advantage that a larger number of effective pixels can be obtained with a number of pixels identical with those in the one having the square check form arrangement of reading elements.

As described above, the area CCD sensor in which reading elements are arranged in a hound's tooth check form has many advantages compared with the one having the square check form arrangement of reading elements.

However, a (film) scanner making full use of such excellent characteristics has not been realized yet.

SUMMARY OF THE INVENTION

The present invention has been devised in view of the above and other drawbacks, and it is an object of the present invention to provide an interpolation arithmetic method and an image reader (a film scanner) that are capable of, when reading a film image using an area CCD sensor in which reading elements are arranged in a hound's tooth check form, making full use of excellent characteristics of the area CCD sensor.

According to the present invention, an image can be read with high accuracy, and an output of a high-resolution image with less artifacts is available by making full use of the excellent characteristics of the above-mentioned area CCD sensor having the hound's tooth check form arrangement of reading elements.

In order to attain the object described above, the present invention provides an interpolation arithmetic method comprising the steps of performing allocation of second image signals by interpolating first image signals of neighboring two or more reading elements outputted from an area image sensor in which the reading elements are arranged in a hound's tooth check form; and rearranging the second image signals or the first and second image signals in a square check form from the first image signals outputted from the reading elements of the area image sensor.

Preferably, the first image signals of the neighboring two or more reading elements are those of two reading elements closest to each other.

Preferably, the first image signals of the neighboring two or more reading elements are those of neighboring four reading elements.

Preferably, the first image signals of the neighboring two or more reading elements are those of neighboring sixteen reading elements.

Preferably, the allocation of a second image signal is performed in a position between the interpolated reading elements.

Preferably, the allocation of a second image signal is performed in a midpoint between the interpolated reading elements.

In order to attain the object described above, the present invention provides an image reader comprising a light source section for emitting reading light incident on a film held in a predetermined reading position; an area image sensor in which reading elements are arranged in a hound's tooth check form; an imaging optical system for imaging on the area image sensor projected light which carries an image photographed on the film and which is obtained by making the reading light incident on the film; and at least one of a pixel shifting device of the area image sensor, and an interpolation arithmetic section for rearranging second image signals of pixels by interpolating first image signals outputted from the respective reading elements of the area image sensor.

Preferably, the image reader comprises both of the pixel shifting device and the interpolation arithmetic section, a reading mode for performing only pixel shifting, a reading mode for performing only rearrangement of the second image signals of the pixels and a reading mode for performing both of the pixel shifting and the rearrangement of the second image signals of the pixels are provided, and one of the reading modes and a number of times of the pixel shifting are selected in accordance with a resolution designated for image reading and a magnification of an output.

Preferably, the interpolation arithmetic section uses an interpolation arithmetic method comprising the steps of performing allocation of second image signals by interpolating first image signals of neighboring two or more reading elements outputted from an area image sensor in which the reading elements are arranged in a hound's tooth check form and rearranging the second image signals or the first and second image signals in a square check form from the first image signals outputted from the reading elements of the area image sensor.

Preferably, the first image signals of the neighboring two or more reading elements are those of two reading elements closest to each other.

Preferably, the first image signals of the neighboring two or more reading elements are those of neighboring four reading elements.

Preferably, the first image signals of the neighboring two or more reading elements are those of neighboring sixteen reading elements.

Preferably, the allocation of a second image signal is performed in a position between the interpolated reading elements.

Preferably, the allocation of a second image signal is performed in a midpoint between the interpolated reading elements.

DETAILED DESCRIPTION OF THE PREFERRED EMBODIMENTS

An interpolation arithmetic method and an image reader in accordance with the present invention will be hereinafter described in detail based on preferred embodiments shown in accompanying drawings.

Figure 1:
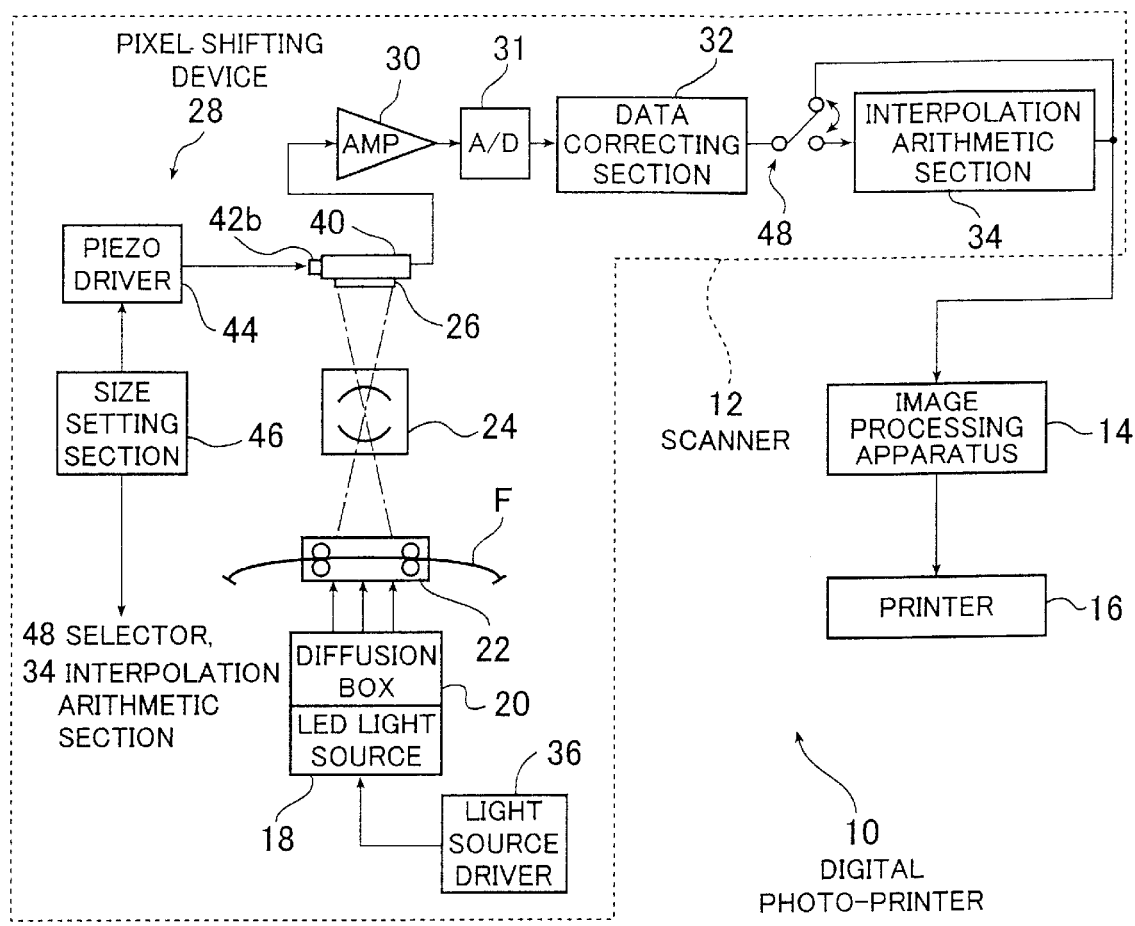
FIG. 1 is a block diagram of an example of a digital photo-printer utilizing the present invention.

FIG. 1 shows a block diagram of an example of a digital photo-printer utilizing the present invention.

The digital photo-printer (hereinafter referred to as the photo-printer) 10 shown in FIG. 1 is basically composed of a scanner (an image reader) 12, an image processing apparatus 14, and a printer 16.

The scanner 12 is an apparatus for photoelectrically reading an image photographed on a film F frame by frame, and has an LED light source 18, a diffusion box 20, a (film) carrier 22, an imaging lens unit 24, a hound's tooth check CCD 26 as an area image sensor, pixel shifting device 28 of the hound's tooth check CCD 26, an amplifier 30, an A/D (analog/digital) converter 31, a data correcting section 32, and an interpolation arithmetic section 34.

Figure 5A:
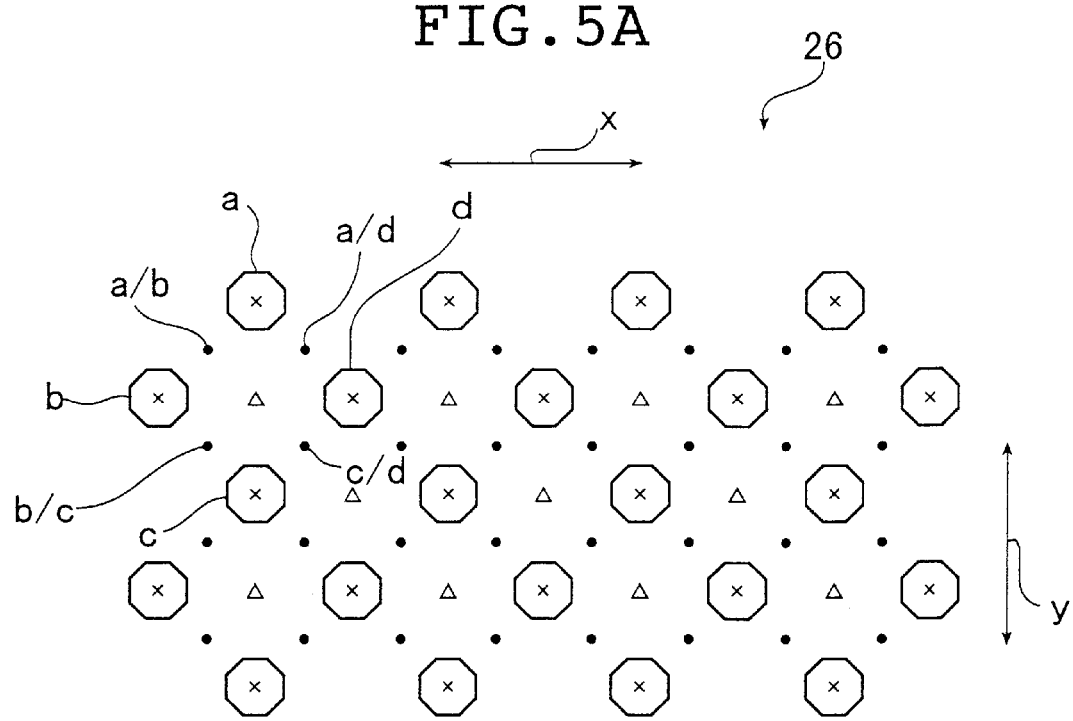
FIGS. 5A and 5B are schematic views of an arrangement of CCD elements for describing image reading in an image reader in accordance with the present invention.

The scanner 12 is the image reader of the present invention, and implements the interpolation arithmetic method of the present invention. Therefore, the hound's tooth check CCD 26 is an area CCD sensor in which reading elements are arranged in a hound's tooth check form as shown in FIG. 5A.

Figure 2:
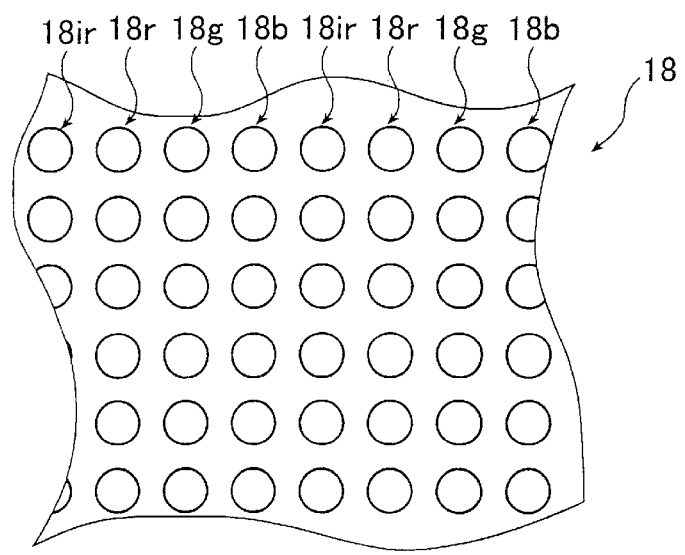
FIG. 2 is a schematic view of an LED light source of a scanner of the digital photo-printer shown in FIG. 1.

The LED light source 18 emits reading light for reading an image photographed on the film F. As conceptually shown in FIG. 2, the LED light source 18 has a configuration in which an LED array 18r for emitting R (red) light, an LED array 18g for emitting G (green) light, an LED array 18b for emitting B (blue) light, and an LED array 18ir for emitting IR (infrared) light are arranged in the direction perpendicular to the direction of arrangement of each array. Further, the IR light is used in detecting a foreign article stuck to the film F, a defect on the film F, or the like.

A light source driver 36 is connected to the LED light source 18, and on/off and an amount of light (an amount of reading light) of each LED array are controlled by the light source driver 36.

The diffusion box 20 diffuses the reading light emitted from the LED light source 18, and uniforms reading lights incident on the film F in the surface direction of the film F.

There is no specific limitation on devices for diffusing reading light, and various kinds of known devices are available. The illustrated diffusion box 20 is shown as an example in which upper and lower surfaces (open surfaces) of a mirror box whose inner surface is a reflecting surface are blocked by a light diffusing plate.

The carrier 22 carries the film F in the longitudinal direction, and carries respective images (frames) photographed on the film F one by one to a predetermined reading position and holds the images.

The carrier 22 is a usual film carrier that has a device for carrying a film, a mask for regulating a reading area, a reader of a barcode such as a DX that is photoelectrically recorded on the film F, a recorder/reader of magnetic information (the Advanced Photo System), and the like, and is attached to a known photo-printer (analog and digital).

As in various kinds of photo-printers, a dedicated carrier 22 that is detachably attached to a body of the scanner 12 is prepared for the photo-printer 10 (the scanner 12) in accordance with a size and the like of a film such as Advanced Photo System or a negative film of 135-size, and the photo-printer 10 can cope with various kinds of films and processing by changing the carrier.

The reading light emitted from the LED light source 18 and diffused by the diffusing box 20 is incident on one frame of the film F held in the predetermined reading position by the carrier 22, and penetrates the frame. In this way, projected light carrying the image photographed on the frame is obtained.

The projected light is imaged on the receiving surface of the hound's tooth check CCD 26 by the imaging lens unit 24, photoelectrically converted and read, and the image photographed on the film F is photoelectrically read by the scanner 12.

The scanner 12 in the illustrated example resolves the image photographed on the film F into the three primary colors, R, G and B for reading by emitting reading lights of R, G and B (or, IR as well) one by one from the LED light source 18, making the lights to be incident on the film F, and reading their projected lights by the hound's tooth check CCD 26.

In addition, for each frame, the scanner 12 (the photo-printer 10) usually performs two sorts of image reading, i.e., a fine scan for obtaining an output image and a pre-scan preceding the fine scan for determining reading conditions of the fine scan and image processing conditions. That is, a frame is read at least six times ([R, G, B]×2, or seven or eight times including IR). The scanner 12 (the photo-printer 10) performs the same as an ordinary film scanner in this regard.

As described above, in the scanner 12 in accordance with the present invention, the hound's tooth check CCD 26 is an area CCD sensor in which reading elements (respective receiving sections of CCD elements) are arranged in a hound's tooth check form.

That is, as shown in FIG. 5A, in the hound's tooth check CCD 26, reading elements (indicated by octagons) are arranged zigzag with respect to the latitudinal direction of the film F indicated by an arrow x (or the longitudinal direction of the film F indicated by an arrow y).

As described above, the hound's tooth check CCD 26 is advantageous in respect of the sensitivity, the S/N ratio, the dynamic range, and the number of effective pixels compared with the ordinary area CCD sensor in which the reading elements are arranged in a square check form.

In addition, as described in detail later, the image reader in accordance with the present invention can improve the resolution of image reading with a fewer number of times of pixel shifting than a CCD sensor in which reading elements are arranged in a square check form (herein after referred to a square check CCD) Therefore, in a photo-printer and the like, high productivity can be secured when an image is read by performing pixel shifting for outputting a high quality mode print or a large size print.

In the scanner 12 in the illustrated example, the hound's tooth check CCD 26 is held on a base 40 that is movable in the x direction and the y direction by any known method, and the pixel shifting device 28 is engaged with the base 40.

The pixel shifting device 28 performs what is known as pixel shifting for improving resolution of image reading by moving the hound's tooth check form CCD 26 in at least one of the x and y directions in order to improve pixel density of image reading.

In the present invention, there is no limit on the pixel shifting device 28, i.e., the device for moving the hound's tooth check CCD 26, and various kinds of known image shifting device using the area CCD sensor are available.

Figure 3:
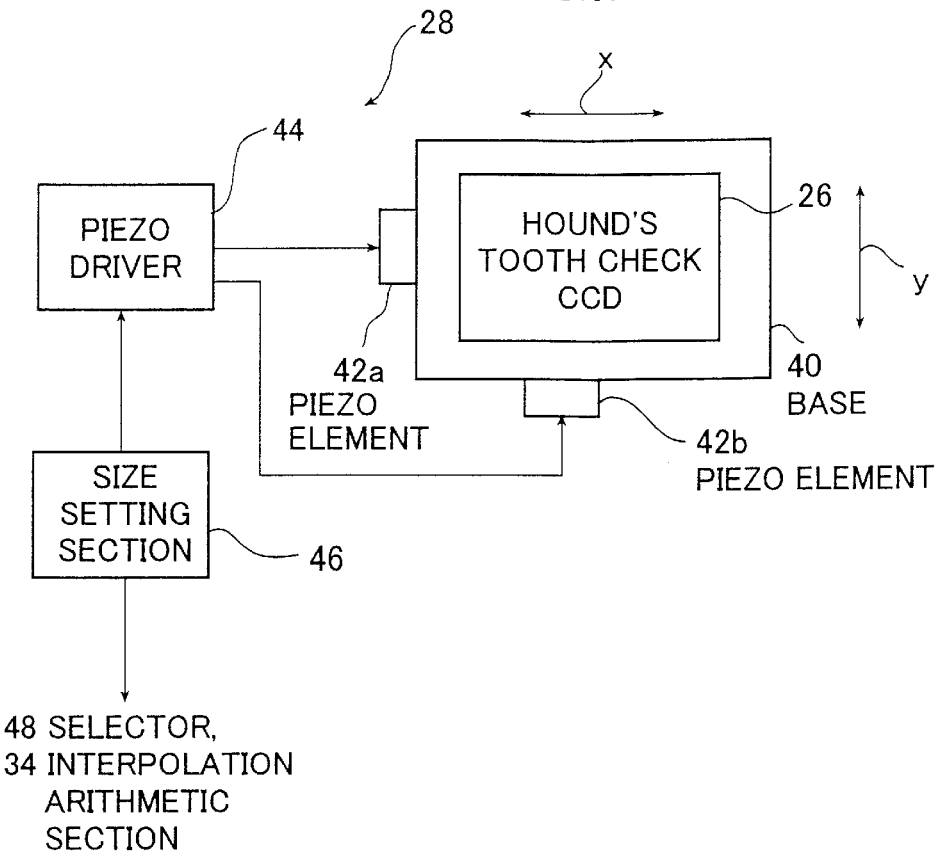
FIG. 3 is a schematic diagram of a pixel shifting section of the scanner of the digital photo-printer shown in FIG. 1.

In the illustrated example, as shown in FIG. 3, the pixel shifting device 28 is composed of two Piezo elements including a Piezo element 42a that moves the base 40 (the hound's tooth check CCD 26) in the x direction and a Piezo element 42b that moves the base 40 in the y direction, a Piezo driver 44 that drives the Piezo elements 42a and 42b, and a size setting section 46.

Further, as an example, the scanner 12 of the illustrated example has three reading modes, and four reading sizes (the number of pixels read by performing image reading once (reading one color)=resolution) are set by a combination of the reading mode and the number of times of the image shifting.

The size setting section 46 performs driving, i.e., pixel shifting, of the Piezo elements 42a and 42b by controlling the Piezo driver 44 according to the set reading size, and sends information on the reading size to the interpolation arithmetic section 34 and the like. This will be described in detail later.

An output signal (an image signal) of the hound's tooth check CCD 26 is amplified by the amplifier 30 and is converted to a digital image signal by the A/D converter 31. The CCD correcting section 32 performs a predetermined data correction such as DC offset correction, dark correction or shading correction on the digital image signal.

The image signal processed at the CCD correcting section 32 is sent to the image processing apparatus 14 after being processed by the interpolation arithmetic section 34 if the pixels are rearranged under operation of a selector 48 according to the reading size. On the other hand, if the pixels are not rearranged, the image signal is sent directly to the image processing apparatus 14.

As described above, the scanner 12 in accordance with the present invention reads the image photographed on the film F using the hound's tooth check CCD 26. However, in order to output the image, the pixels need to be arranged in a square check form.

The interpolation arithmetic section 34 is for implementing an interpolation arithmetic method of the present invention, which rearranges the pixels by performing interpolation arithmetic of the image signal processed by the CCD correcting section 32 if necessary, and converts an arrangement of pixels (output pixels) of an image (an image signal) to be outputted to the image processing apparatus 14 to a square check form. The interpolation arithmetic section 34 will be described in detail later.

Further, in the scanner 12 of the illustrated example, the interpolation arithmetic section 34 rearranges the pixels by the interpolation arithmetic using an (antilogarithmic) image signal that is not logarithmically converted. However, the present invention is not limited to this, and the interpolation arithmetic section 34 may rearrange the pixels by the interpolation arithmetic using an image signal that is logarithmically converted (i.e., density data) with a logarithmic converter disposed after the CCD correcting section 32.

The logarithmic conversion is performed, for example, by a logarithmic converter using a look-up table (LUT).

As described above, the scanner 12 has three reading modes (mode 1 through mode 3), and four reading sizes (size 1 through size 4) are set in the scanner 12 by combining the reading modes and the number of times of pixel shifting.

The mode 1 is the mode for only performing rearrangement of pixels by the interpolation arithmetic section 34 without performing pixel shifting. In addition, the mode 2 is the mode for only performing pixel shifting using the pixel shifting device 28 without performing rearrangement of pixels. Further, the mode 3 is the mode for performing both pixel shifting and rearrangement of pixels.

Therefore, according to information from the size setting section 46, the CCD correcting section 32 and the interpolation arithmetic section 34 are connected by the selector 48 in the mode 1 and the mode 3, and the CCD correcting section 32 and the image processing apparatus 14 are connected by the selector 48 in the mode 2.

With the scanner 12 in accordance with the present invention having the three reading modes, an optimal reading mode can be selected in which high productivity and high-resolution are well balanced according to various kinds of reading sizes (resolutions).

On the other hand, the reading size is appropriately selected according to a size of a print to be outputted by the photo-printer 10 and magnification of an image and the like. The scanner 12 performs image reading once or for each color (R, G and B, or IR in addition) with the reading mode and the number of times of pixel shifting corresponding to the reading size.

For example, information on a print size or magnification inputted by an operator is supplied to the size setting section 46, which selects the reading size according to the information, controls the Piezo driver 44 of the pixel shifting device 28 according to pixel shifting to be performed, and supplies information on the reading side (reading mode) to the selector 48 and the interpolation arithmetic section 34.

The size 1 is the minimum size (has minimum number of pixels) of image reading for performing image reading in the mode 1. For example, the size 1 is selected when a print of an ordinary size such as the L size, the C type, the H type or the like is prepared from a film of 135 size and a film of the Advanced Photo System (I×240).

As described above, the image reading by the mode 1 is the mode for performing only rearrangement of pixels by the interpolation arithmetic in the interpolation arithmetic section 34 without performing pixel shifting.

As described above, the interpolation arithmetic section 34 implements the interpolation arithmetic method in accordance with the present invention in image reading using the hound's tooth check CCD 26.

That is, the interpolation arithmetic section 34 interpolates image signals of reading elements closest to each other according to the information on reading size from the size setting section 46, and performs rearrangement of pixels by outputting only an interpolated image signal without outputting an image signal (an original signal) by the hound's tooth check CCD 26, and rearranges the outputted images in a square check form. In other words, the interpolation arithmetic section 34 rearranges pixels by performing interpolation between reading elements that are made adjacent to each other in the diagonal direction with respect to the arrangement of reading elements in the square check direction (the x and y directions) to which the hound's tooth check CCD 26 corresponds.

Further, an allocating position of the image signal obtained by interpolation will suffice if the outputted pixels can be arranged in a square check form in the position. It is preferable to arrange the pixels in a square check form by allocating each pixel between two interpolated elements, particularly it is preferable to arrange the pixels in a square check form by allocating each pixel in the middle of both the elements.

The interpolation arithmetic method in accordance with the present invention that is implemented by the interpolation arithmetic section 34 will be hereinafter described with reference to FIG. 5A which schematically illustrates an arrangement of the reading elements (hereinafter simply referred to as the elements) of the hound's tooth check CCD 26.

For example, looking at an element a, elements closest each other are b and d in FIG. 5A. The interpolation arithmetic section 34 calculates an average value of image signals of the elements a and b ([a+b/2]) as an output image signal, and allocates the calculated output image signal in a middle position of the centers of gravity of both the elements (indicated by x in FIG. 5A) a/b as an output pixel position (indicated by . in FIG. 5A). Moreover, the interpolation arithmetic section 34 calculates an average value of the image signals of the elements a and d in the same manner, and allocates the average value in the middle position of the centers of gravity of both the elements a/d as an output image signal.

Then, the interpolation arithmetic section 34 calculates an average value of image signals of the elements b and c and allocates the value in the middle position of both the elements b/c, and calculates an average value of image signals of the elements c an d and allocates the value in the middle position of both the elements c/d. Thereafter, in the same manner, the interpolation arithmetic section 34 repeats calculating an average value of an image signal of elements closest to each other as an output image signal, and allocating the output image signal in an output image position in the middle of both the elements, and regards the middle positions only as output pixel positions without outputting original signals. In this way, the outputted pixels are rearranged in a square check form, and is supplied to the image processing apparatus 12.

That is, in the interpolation arithmetic method in accordance with the present invention, the center of gravity of an element and the output pixel position are different.

Figure 4:
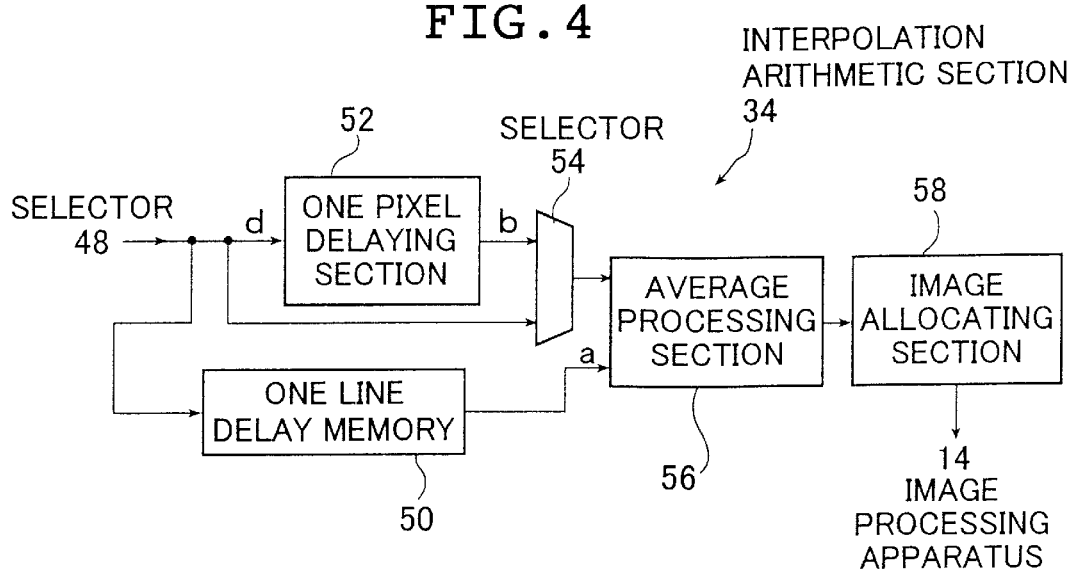
FIG. 4 is a schematic diagram of an interpolation operating section of the scanner of the digital photo-printer shown in FIG. 1.

As shown in FIG. 4, the interpolation arithmetic section 34 which implements the interpolation arithmetic method of the present invention is composed of a one line delay memory 50, a one pixel delaying section 52, a selector 54, an average processing section 56, and an image allocating section 58.

As an example, regarding an element line in the arrow x direction (latitudinal direction) as one line, image signals are supplied to the interpolation arithmetic section 34 one after another from the upper to lower lines in FIG. 5A. In addition, image signals are transferred one after another from an element in the left in FIG. 5A in one line.

Describing the above-mentioned elements a, b and d as an example, the image signal in the upper line (the line of the element a) is transferred to the average processing section 56 with the delay of one line by the one line delay memory 50.

On the other hand, each image signal of the line (the line of elements b and d) being transferred is transferred to both the one pixel delaying section 52 and the selector 54 subsequently, image signals of the elements b and d are selected by the selector 54 and transferred to the average processing section 56 in order. That is, an image signal of each element is sent to the selector 54 simultaneously with an image signal of the next element by the operation of the one pixel delaying section 52.

As described above, the average processing section 56 averages the image signals of the corresponding elements a and b as well as a and d, and sends the averaged image signals to the pixel allocating section 58 as output image signals in the middle positions a/b and a/d. The pixels are rearranged by the image allocating section 58 allocating the output image signals to the middle positions a/b and a/d, and an image signal in which the pixels are arranged in a square check form is sent to the image processing section 14.

Usually, when pixels are rearranged by applying the interpolation arithmetic to an image signal of the hound's tooth check CCD 26, output pixels are arranged in a square check form by generating an image signal in the middle position of four elements.

For example, an output image signal is calculated by averaging four image signals of the elements a through d ([a+b+c+d])/4), and the calculated output image signal is allocated to the middle position of the elements a through d (indicated by □) as an output pixel position. Regarding the □ position and the barycentric position of each element as the output element position, output images are arranged in a square check form.

However, with this method, artifacts may be generated on a reproduced image.

Figure 6A:
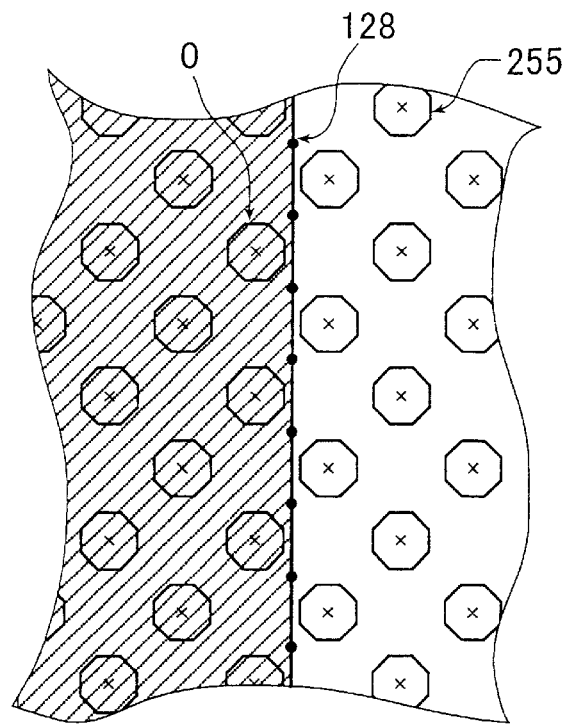
FIG. 6A is a schematic view for describing rearrangement of pixels by an interpolation arithmetic method in accordance with the present invention.
Figure 6B:
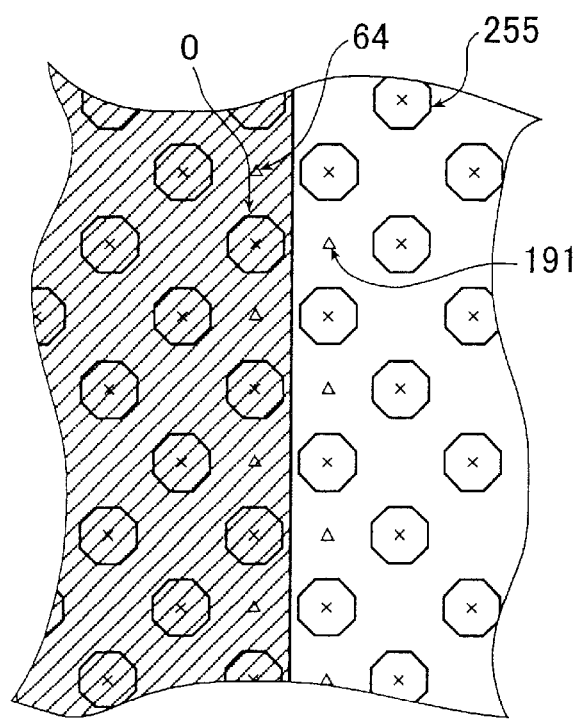
FIG. 6B is a schematic view for describing rearrangement of pixels by a conventional interpolation arithmetic method.

For example, in case the image signal is a digital signal of 8 bits, an image signal of white is 255, and an image signal of black is 0, as shown in FIGS. 6A and 6B, there is an image in which a black area (the left side of FIGS. 6A and 6B) and a white area (the right side of FIGS. 6A and 6B) are placed side by side around a linear edge.

In this case, with the conventional interpolation arithmetic method, an image signal of an output image position (indicated by □) obtained by interpolation has a value of 64 ([0+0+0+255/4]) in the black area side, and a value of 191 ([255+255+255+0/4]) in the white area side as shown in FIG. 6B.

That is, with the conventional interpolation method, an image signal obtained by reading (indicated by a solid line) and an image signal obtained by the interpolation are alternately arranged at an end part of each area (0 and 64 as well as 255 and 191), and different image signals (64 and 191) are alternately arranged around the edge. Thus, there is a problem of degradation of image quality due to artifacts generated in the edge part of the image.

On the other hand, according to the above-mentioned interpolation method of the present invention, only the image signal obtained by interpolation is outputted and, as shown in FIG. 6A, same signals (128=[0+255]/2) are arranged in the edge parts of the white area and the black area.

Thus, it is possible to constantly reproduce a high-resolution image with little artifacts.

In the scanner 12 of the illustrated example, the size 2 is the size for performing image reading by the mode 2, and pixel shifting is performed once by the pixel shifting device 28. That is, in the size 2, two pages are read by image reading of one color (two page reading by shifting pixel once). This means that one color image of one frame is read two times using all area of the light receiving surface of the hound's tooth check CCD 26. Further, as described above, in the mode 2, rearrangement (of the interpolated image signals) of pixels by the interpolation arithmetic section 34 is not performed, and only pixel shifting is performed.

The reading size 2 is selected when a print slightly larger than the reading size 1 (for example, the 2L size) or a trimmed image accompanying slight enlargement is prepared.

Figure 5B:
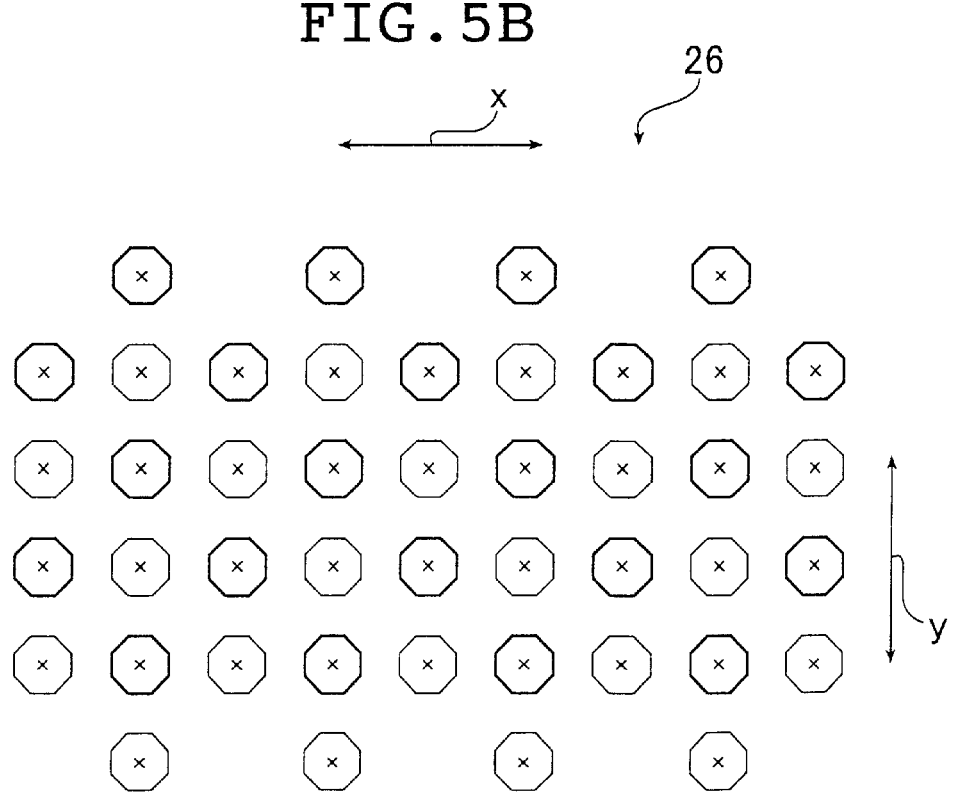

FIG. 5B schematically illustrates an arrangement of elements in the size 2. In the size 2, a first page (first time) is read in a position not shifted by pixel shifting shown by a bold line (this position is hereinafter referred to as a standard position in FIG. 5B) as in the reading in the size 1.

Then, the first page is read again after performing pixel shifting by the driver 44 driving the Piezo element 42b, moving the hound's tooth check CCD 26 downward in FIG. 5B, and placing elements in positions indicated by thin lines in FIG. 5B. That is, when assuming a distance between the centers of gravity of elements neighboring in the y direction is that between elements in the y direction, and a distance in the x direction is that between elements in the x direction, a second page (second time) is read in a position to which the hound's tooth check CCD 26 is moved downward in FIG. 5B (in the y direction) by ½ of the distance between the elements in the y direction from the reading position of the first page.

As shown in FIG. 5B, in the size 2, the arrangement (of the interpolated image signals) of the pixels can be made to be in the same state as the arrangement in which elements are in a square check form by the pixel shifting.

Therefore, rearrangement (of the interpolated image signals) of pixels by the interpolation arithmetic is unnecessary, and the image signal is sent from the CCD correcting section 32 to the image processing apparatus 14 by the selector 48 with the center of gravity position of each element as an output pixel position.

With the ordinary square check form CCD, in order to increase reading resolution of images by image shifting and obtain an output pixel in a square check form, pixel shifting needs to be performed twice or more, thus, pixel shifting device in two axes in the x and the y directions is necessary.

On the other hand, in the present invention using the hound's tooth check CCD 26, since resolution can be increased by performing pixel shifting once in one direction, resolution can be increased without decreasing reading efficiency, i.e., productivity. In addition, if a scanner is not required more resolution, since pixel shifting device in one axis is enough, apparatus costs can be reduced as well. Further, although the pixel shifting device in two axes in the illustrated example is necessary even in the present invention if larger size image reading is performed as described later, fewer times of pixel shifting compared with the square check CCD is enough if only the same resolution is required. Thus, according to the present invention, high productivity can be maintained in various sizes.

The size 3 is the size for performing image reading by the mode 3, and performs pixel shifting by the pixel shifting device 28 three times and, at the same time, also performs rearrangement of pixels by the interpolation arithmetic section 34. That is, in the size 3, four pages are read by image reading of one color (four page reading by shifting pixel three times). This means that one color image of one frame is read four times using all area of the light receiving surface of the hound's tooth check CCD 26.

The size 3 is selected when a print of larger size than the size 2 (for example, the 203×254 mm size or the 254×305 mm size) or an image with considerable enlargement is prepared.

Figure 7A:
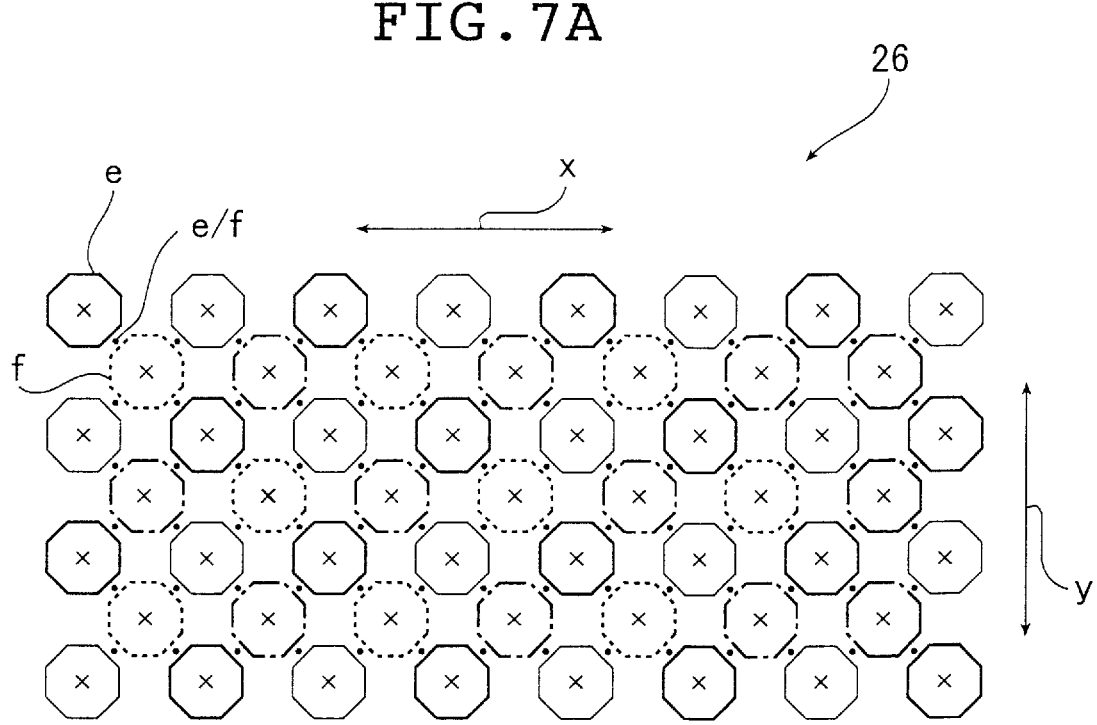
FIGS. 7A and 7B are schematic views of an arrangement of CCD elements for describing image reading in the image reader in accordance with the present invention.

FIG. 7A schematically illustrates an arrangement of elements in the size 3. In the size 3, for example, a first page is read in the standard position indicated by a bold line in FIG. 7A.

Then, the second page is read after performing first pixel shifting by the driver 44 driving the Piezo element 42*a*, moving the hound's tooth check CCD 26 rightward (the x direction) in FIG. 7A from the reading position of the first page, and placing elements in positions indicated by thin lines in FIG. 7A.

Then, the third page is read after performing second pixel shifting by the driver 44 driving the Piezo elements 42*a* and 42*b*, moving the hound's tooth check CCD 26 rightward in FIG. 7A by ¼ of the distance between the x direction elements and downward by ¼ of the distance between the y direction elements respectively from the reading position of the second page, and placing elements in positions indicated by alternate long and short dot lines in FIG. 7A.

Further, the fourth page is read and the four page reading by shifting pixel three times is completed after performing third pixel shifting by the driver 44 driving the Piezo element 42*a*, moving the hound's tooth check CCD 26 leftward in FIG. 7A by ½ of the distance between the x direction elements from the reading position of the third page, and placing elements in positions indicated by dotted lines in FIG. 7A.

On the other hand, the interpolation arithmetic section 34 performs interpolation arithmetic using the image signal obtained by the four page reading by shifting pixel three times, performs rearrangement of the pixels, and arranges the pixels in a square check form.

The rearrangement of the pixels by the interpolation arithmetic is performed in the same manner as in the above-mentioned size 1. That is, the pixels are arranged in a square check form by image interpolating signals of elements closest to each other to have an output image signal, allocating the output image signal with the middle position of both the elements as an output pixel position (indicated by .), and regarding only the middle position as the output pixel position.

Here, in the present invention, elements closest to each other in the interpolation arithmetic when pixel shifting is performed do not mean elements closest to each other in the hound's tooth check CCD 26 itself, but means elements closest to each other in a state in which elements are positioned in positions corresponding to reading of all the pages.

For example, an output image signal is obtained by interpolating an image signal of an element e in reading the first page and an image signal of an element f in reading the fourth page, and the output image signal is allocated in a middle position between both the elements e/f as an output image position.

The size 4 is the size for performing image reading by the mode 2, and reads an image by performing pixel shifting seven times. That is, in the size 4, eight pages are read by image reading of one color (eight page reading by shifting pixel seven times). This means that one color image of one frame is read eight times using all area of the light receiving surface of the hound's tooth check CCD 26.

The size 4 is selected when a print of a largest size (for example, the 356×432 mm size) is prepared or enlargement is large.

Figure 7B:
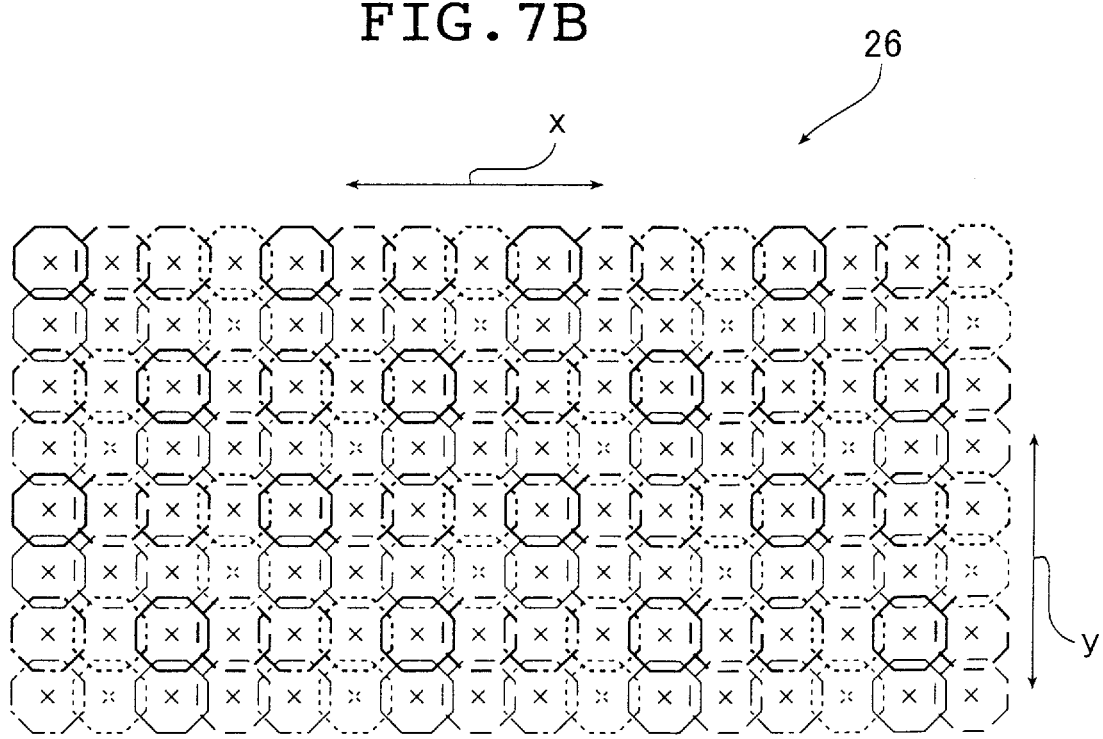

FIG. 7B schematically illustrates an arrangement of elements in the size 4. In the size 4 as well, for example, a first page is read in the standard position indicated by bold lines in FIG. 7B.

Then, the second page is read after performing first pixel shifting by the driver 44 driving the Piezo element 42*a*, moving the hound's tooth check CCD 26 rightward in FIG. 7B by ¼ of the x direction elements from the reading position of the first page, and placing elements in positions indicated by bold broken lines in FIG. 7B. Thereafter, in the same manner, by repeating driving the Piezo element 42*a*, moving the moving the hound's tooth check CCD 26 rightward in FIG. 7B by ¼ of the x direction elements, and reading, the third page is read in the position indicated by a bold alternate long and short dot line after second pixel shifting, and the fourth page is read in the position indicated by a bold dotted line after third pixel shifting, respectively.

Then, the fifth page is read after performing fourth pixel shifting by the driver 44 driving the Piezo element 42*b*, moving the hound's tooth check CCD 26 downward in FIG. 7B by ¼ of the y direction elements from the reading position of the fourth page, and placing elements in positions indicated by thin dotted lines in FIG. 7B.

Moreover, the sixth page is read after performing fifth pixel shifting by the driver 44 driving the Piezo element 42*a*, moving the hound's tooth check CCD 26 leftward in FIG. 7B by ¼ of the x direction elements from the reading position of the fifth page, and placing elements in positions indicated by thin alternate long and short lines in FIG. 7B. Thereafter, in the same manner, by repeating driving the Piezo element 42*a*, moving the hound's tooth check CCD 26 leftward in FIG. 5A by ¼ of the x direction elements, and reading, the seventh page is read in the position indicated by a thin broken line after sixth pixel shifting, the eighth page is read in the position indicated by a thin line after seventh pixel shifting, respectively, and the eight page reading by shifting pixel seven times is completed.

As shown in FIG. 7B, since the arrangement of the pixels can be made to be in the same state as the arrangement in which elements are in a square check form by the pixel shifting in the size 4 as well, rearrangement of pixels by the interpolation arithmetic is unnecessary, and the image signal is sent from the CCD correcting section 32 to the image processing apparatus 14 by the selector 48 with the barycentric position of each element in each page as an output pixel position.

Further, in the present invention, the reading size to be set is not limited to the above-mentioned sizes 1 through 4, but various sizes can be set such as a size for performing pixel shifting seven times or more.

The illustrated embodiment performs linear interpolation from image signals of reading elements closest to each other, namely from two image data. Implementation of such linear interpolation is easy because of its simple arithmetic operation, but the high frequency characteristic is impaired, which causes a problem of reduction in sharpness. That is, in this case, easy implementation and sharpness have a trade-off relationship.

In order to solve the problem of reduction in sharpness, Cubic interpolation can be used which does not deteriorate the high frequency characteristic as compared with the linear interpolation, although the arithmetic operation is more complicated. The Cubic interpolation is an interpolation algorithm including Cubic sine, Cubic spline and Cubic Bspline which have different characteristics depending on weighting factors used.

Thus, a one-dimensional Cubic spline interpolation formula and functions for the weighting factors used are shown below.

$$f_{OUT} = w_0(t) f_{k-1} + w_1(t) f_k + w_2(t) f_{k+1} + w_3(t) f_{k+2}$$

where $f_{OUT}$ is a value of a point to be interpolated, $f_{k-1}$, $f_k$, $f_{k+1}$ and $f_{k+2}$ are values of four points used for interpolation, and $w_0(t)$, $w_1(t)$, $w_2(t)$ and $W_3(t)$ are functions of the weighting factors and represented by the following formulae:

$$w_0(t) = (t^3 + 2t^2 - t)/2$$
$$w_1(t) = (3t^3 - 5t^2 + 2)/2$$
$$w_2(t) = (-3t^3 + 4t^2 + t)/2$$
$$w_3(t) = 1 - w_0(t) - w_1(t) - w_2(t)$$

where t is a distance between $f_k$ and a point to be interpolated.

In this way, one-dimensional Cubic interpolation can be used to interpolate from four points, and two-dimensional Cubic interpolation to interpolate from sixteen points.

Figure 8A:
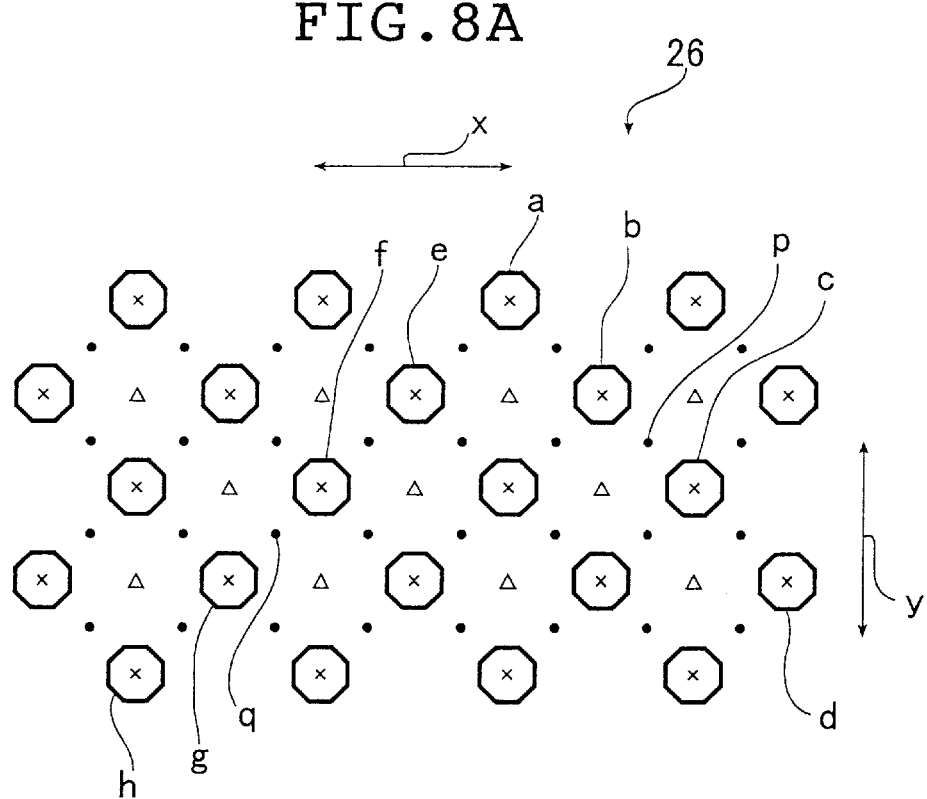
FIGS. 8A and 8B are schematic views for describing image reading performed by the interpolation arithmetic method of the present invention in an arrangement of CCD elements in the image reader of the present invention.

FIG. 8A shows an example in which the one-dimensional Cubic interpolation was applied to interpolate from image signals of neighboring four reading elements in the arrangement of reading elements in the hound's tooth check CCD 26 shown in FIG. 5A.

In this case, the one-dimensional Cubic interpolation can be performed in a direction inclined by 45°.

For instance, a case in which a midpoint p between two points b and c is determined by interpolating four points a, b, c and d which are arranged so as to form a downward line inclined by 45° on right side, and a case in which a midpoint q between two points f and g is determined by interpolating four points e, f, g and h which are arranged so as to form an upward line inclined by 45° on right side are represented by the following formulae:

$$p = a \times w_0(0.5) + b \times w_1(0.5) + c \times w_2(0.5) + d \times w_3(0.5)$$
$$q = e \times w_0(0.5) + f \times w_1(0.5) + g \times w_2(0.5) + h \times w_3(0.5).$$

Figure 8B:
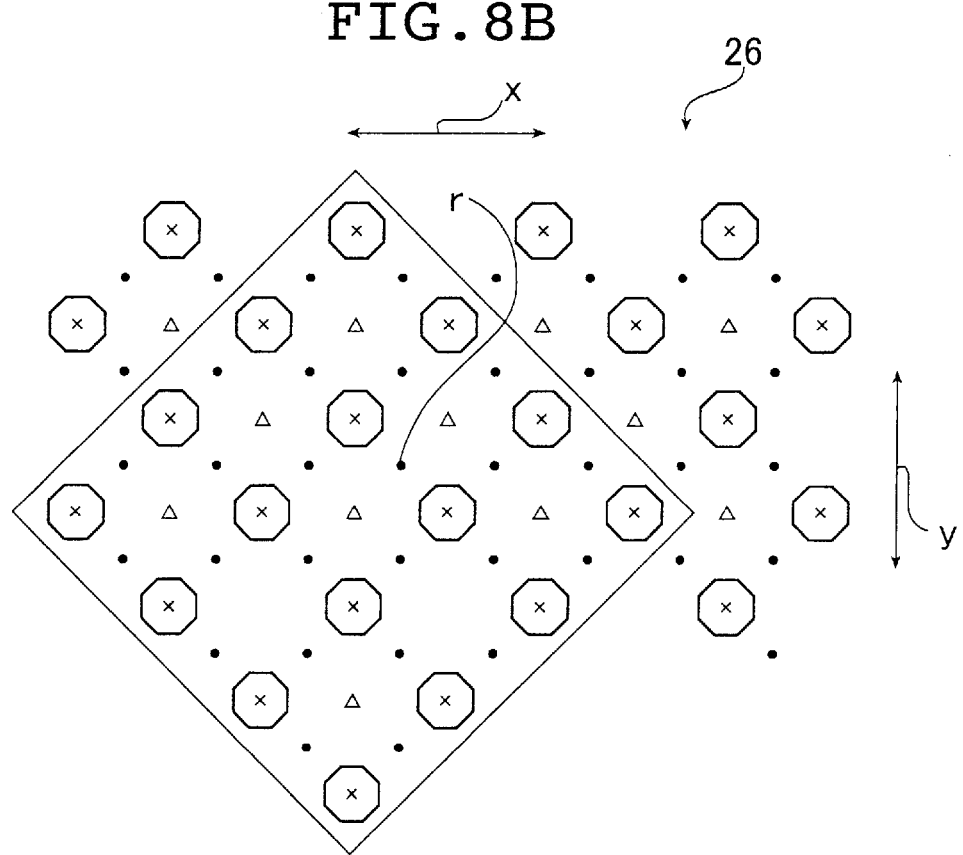

The case in which image signals of neighboring sixteen reading elements are interpolated is shown in FIG. 8B, according to which the two-dimensional Cubic interpolation can be performed for the image signals of the neighboring sixteen reading elements surrounded by a solid line in FIG. 8B in a coordinate system obliquely rotated by 45°, thereby determining the interpolated value of the point r in FIG. 8B. The arithmetic operation formula is omitted but any known two-dimensional Cubic interpolation formula may be used.

For obtaining the interpolated output image signal from image signals of neighboring two or more reading elements, we have mentioned the cases in which image signals of two reading elements closest to each other, those of neighboring four reading elements, and those of neighboring sixteen reading elements were interpolated, respectively. However, these are not the sole cases of the present invention and interpolation may be performed by using image signals of more reading elements or those of a plurality of various reading elements intervening between the above reading elements.

As described above, the image signal processed in the CCD correcting section 32 is sent to the image processing apparatus 14 after the pixels are rearranged in the interpolation arithmetic section 34 if necessary.

The image processing apparatus 14 converts the image signal outputted from the scanner 12 into digital image data (density data) by the logarithmic converter, applies predetermined image processing such as color/density correction, gradation correction, gray balance correction or the like, converts the processed image data using a 3D-LUT or the like, and outputs the image data as image data for recording by the printer 16 or image data for displaying by a display such as a CRT and an LCD.

Further, as described above, the logarithmic converter may be installed after the CCD correcting section 32 in the scanner 12.

The printer 16 exposes a photosensitive material (printing paper) according to the image data outputted from the image processing apparatus 14 to record a latent image, and applies development processing to the latent image according to the photosensitive material to output it as a (finished) print.

For example, after cutting the photosensitive material to a predetermined length according to a print, the printer 16 modulates three types of light beams, R exposure, G exposure and B exposure corresponding to recording of a back print and a spectral response characteristic of the photosensitive material (print paper) according to the image data (the recorded image) and, at the same time, deflects the light beams in a fine scanning direction, performs recording of the latent image, and the like by carrying the photosensitive material in a sub-scanning direction perpendicular to the fine scanning direction, applies predetermined wet-type development processing such as color development, bleach-fixing and water washing on the photosensitive material on which the latent image has been recorded, and classifies and stores a print after drying the processed photosensitive material.

The interpolation arithmetic method and the image reader in accordance with the present invention have been described in detail as described above. Naturally, the present invention is not limited to the above-mentioned embodiments, and may be improved and modified in various ways without departing from the spirit of the present invention.

For example, although the above-mentioned scanner uses the LED light source for emitting reading light of the three primary colors and IR, the present invention is not limited to this. The present invention can be used in various kinds of film scanners as long as a film scanner uses the hound's tooth check CCD such as a scanner for resolving a photographed image on a film into the three primary colors to read the resolved images by inserting each of color filers of white light source and the three primary colors (or an IR filter, in addition) in its course using a filter turret having the filters.

In addition, in the image reader in accordance with the present invention, for example, even if a reading size for performing the mode 2 or the mode 3 is selected, pixel shifting is not necessarily performed in pre-scanning.

As described above, according to the interpolation arithmetic method and the image reader of the present invention, in reading the film image using the area CCD sensor in which reading elements are arranged in a hound's tooth check form, high-precision image reading can be performed making full use of the excellent characteristics of the area CCD sensor, and an image of high-resolution with little artifacts can be outputted with high productivity.

Thus, it is seen that an interpolation arithmetic method and an image reader are provided. One skilled in the art will appreciate that the present invention can be practiced by other than the preferred embodiments which are presented for the purposes of illustration and not of limitation, and the present invention is limited only by the claims which follow.

What is claimed is:

1. An interpolation arithmetic method comprising the steps of:
    performing allocation of second image signals by interpolating first image signals of neighboring two or more reading elements outputted from an area image sensor in which the reading elements are arranged in a hound's tooth check form; and
    rearranging said second image signals or said first and second image signals in a square check form from said first image signals outputted from said reading elements of said area image sensor.

2. The interpolation arithmetic method according to claim 1, wherein the first image signals of said neighboring two or more reading elements are those of two reading elements closest to each other.

3. The interpolation arithmetic method according to claim 1, wherein the first image signals of said neighboring two or more reading elements are those of neighboring four reading elements.

4. The interpolation arithmetic method according to claim 1, wherein the first image signals of said neighboring two or more reading elements are those of neighboring sixteen reading elements.

5. The interpolation arithmetic method according to claim 1, wherein said allocation of a second image signal is performed in a position between the interpolated reading elements.

6. The interpolation arithmetic method according to claim 5, wherein said allocation of a second image signal is performed in a midpoint between the interpolated reading elements.

7. An image reader comprising:
    a light source section for emitting reading light incident on a film held in a predetermined reading position;
    an area image sensor in which reading elements are arranged in a hound's tooth check form;
    an imaging optical system for imaging on said area image sensor projected light which carries an image photographed on the film and which is obtained by making said reading light incident on the film; and
    at least one of a pixel shifting device of said area image sensor, and an interpolation arithmetic section for rearranging second image signals of pixels by interpolating first image signals outputted from the respective reading elements of said area image sensor.

8. The image reader according to claim 7, comprising both of said pixel shifting device and said interpolation arithmetic section, wherein a reading mode for performing only pixel shifting, a reading mode for performing only rearrangement of said second image signals of said pixels, and a reading mode for performing both of said pixel shifting and said rearrangement of said second image signals of said pixels are provided, and wherein one of said reading modes and a number of times of said pixel shifting are selected in accordance with a resolution designated for image reading and a magnification of an output.

9. The image reader according to claim 7, wherein said interpolation arithmetic section uses an interpolation arithmetic method comprising the steps of:
    performing allocation of second image signals by interpolating first image signals of neighboring two or more reading elements outputted from an area image sensor in which the reading elements are arranged in a hound's tooth check form; and
    rearranging said second image signals or said first and second image signals in a square check form from said first image signals outputted from said reading elements of said area image sensor.

10. The image reader according to claim 9, wherein the first image signals of said neighboring two or more reading elements are those of two reading elements closest to each other.

11. The image reader according to claim 9, wherein the first image signals of said neighboring two or more reading elements are those of neighboring four reading elements.

12. The image reader according to claim 9, wherein the first image signals of said neighboring two or more reading elements are those of neighboring sixteen reading elements.

13. The image reader according to claim 9, wherein said allocation of a second image signal is performed in a position between the interpolated reading elements.

14. The image reader according to claim 13, wherein said allocation of a second image signal is performed in a midpoint between the interpolated reading elements.

* * * * *